F. W. HAAS.
RAW WATER FREEZING APPARATUS.
APPLICATION FILED OCT. 21, 1909. RENEWED OCT. 15, 1910.
980,152.
Patented Dec. 27, 1910
4 SHEETS—SHEET 4.
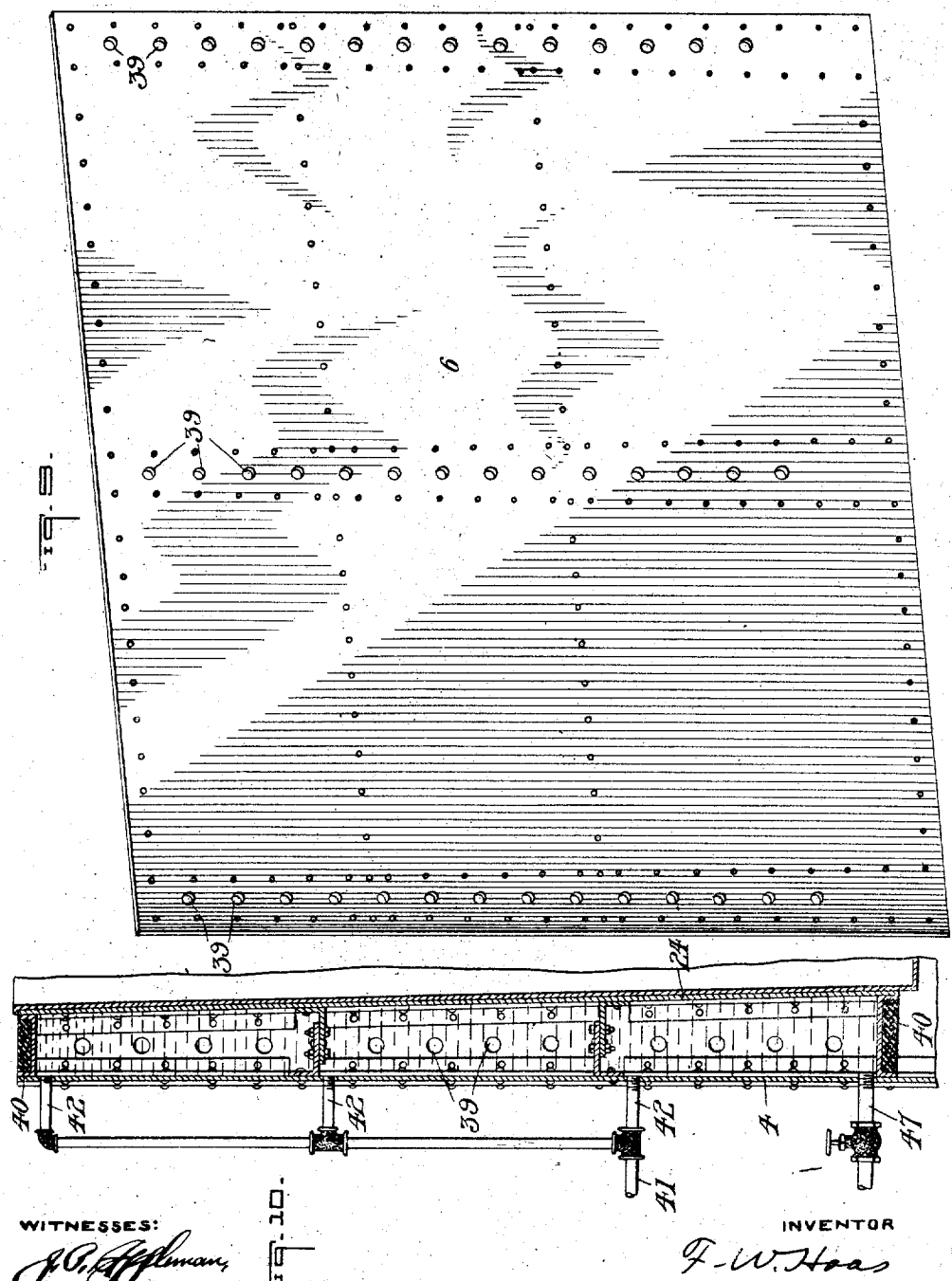

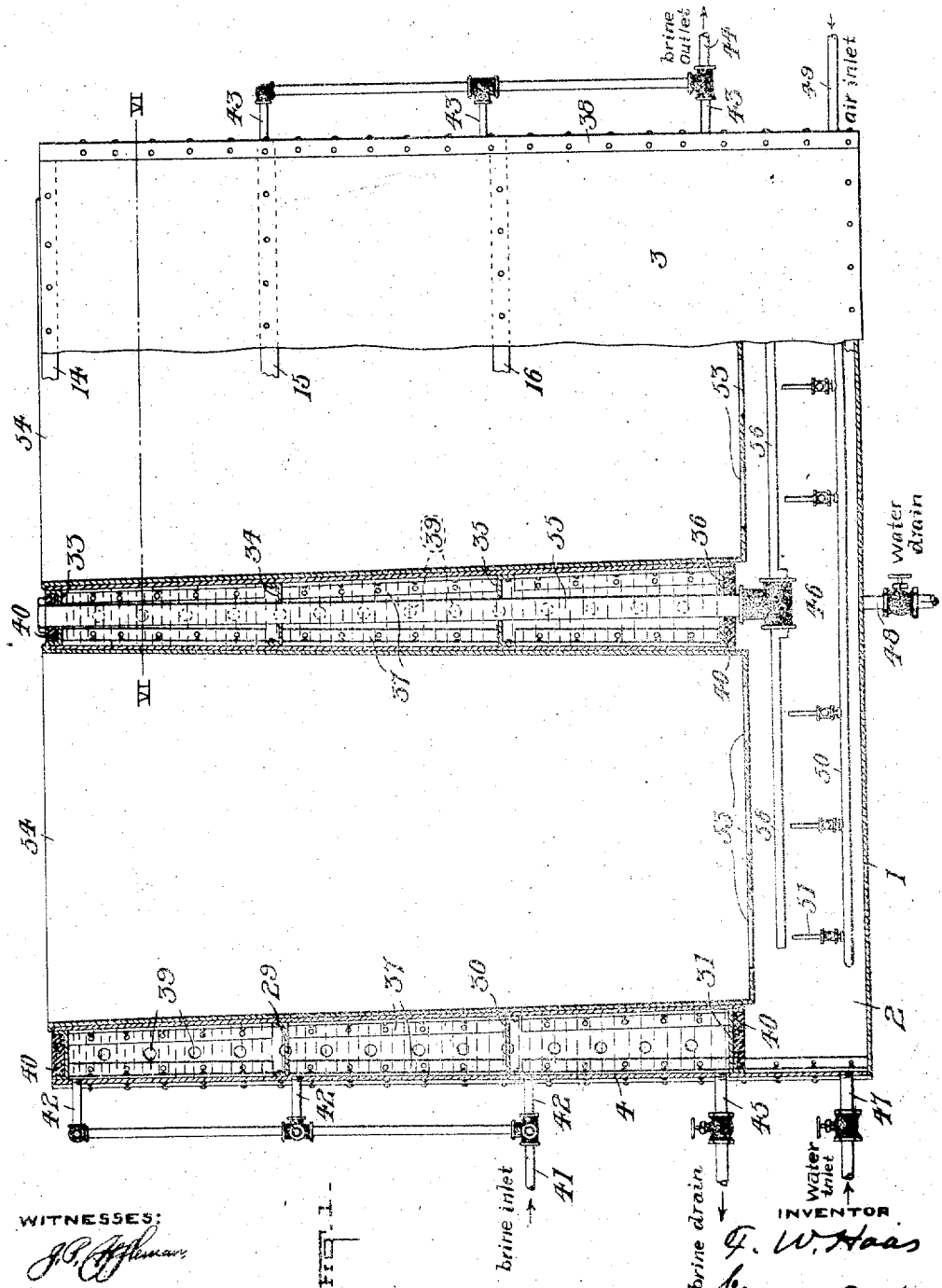

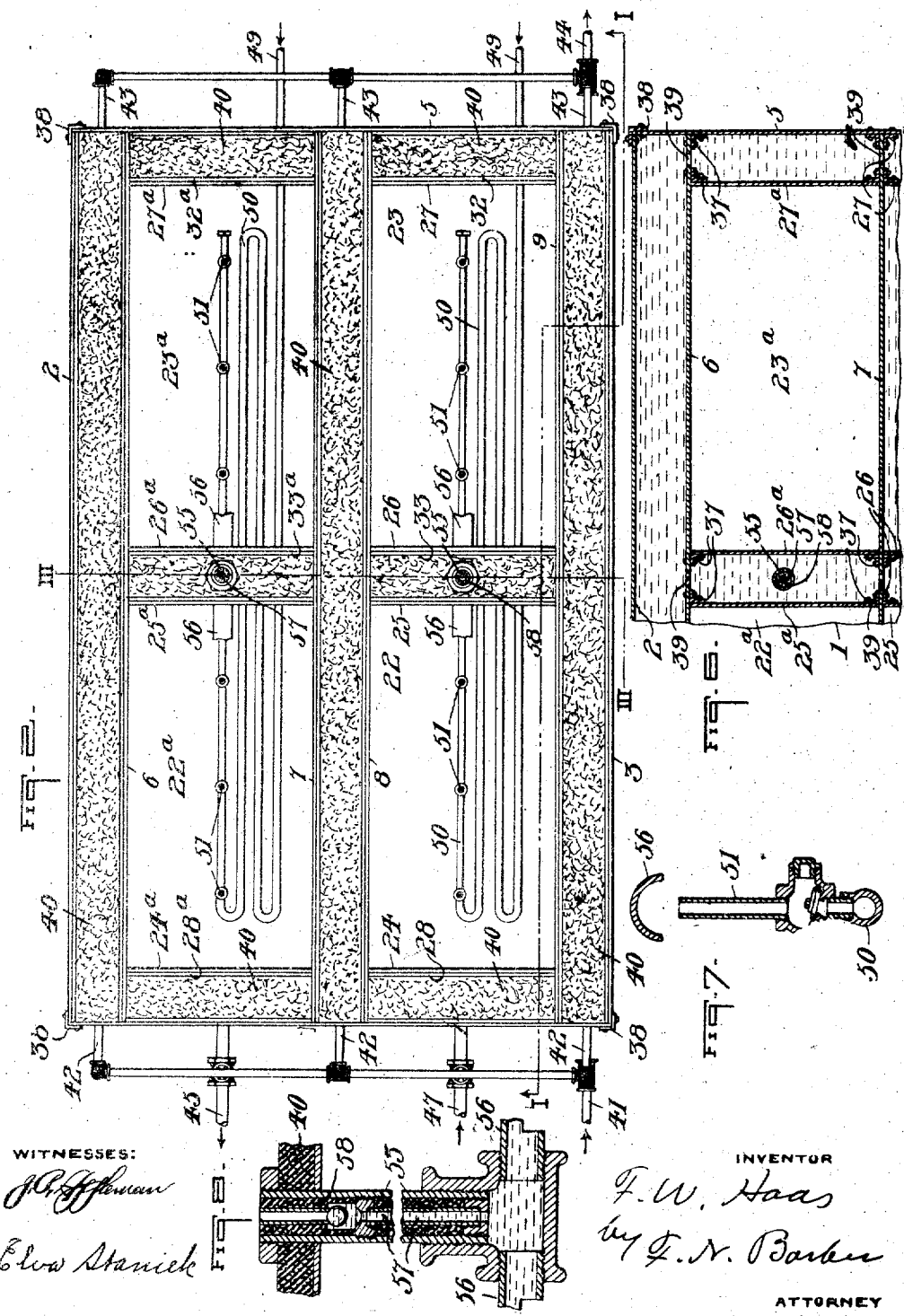

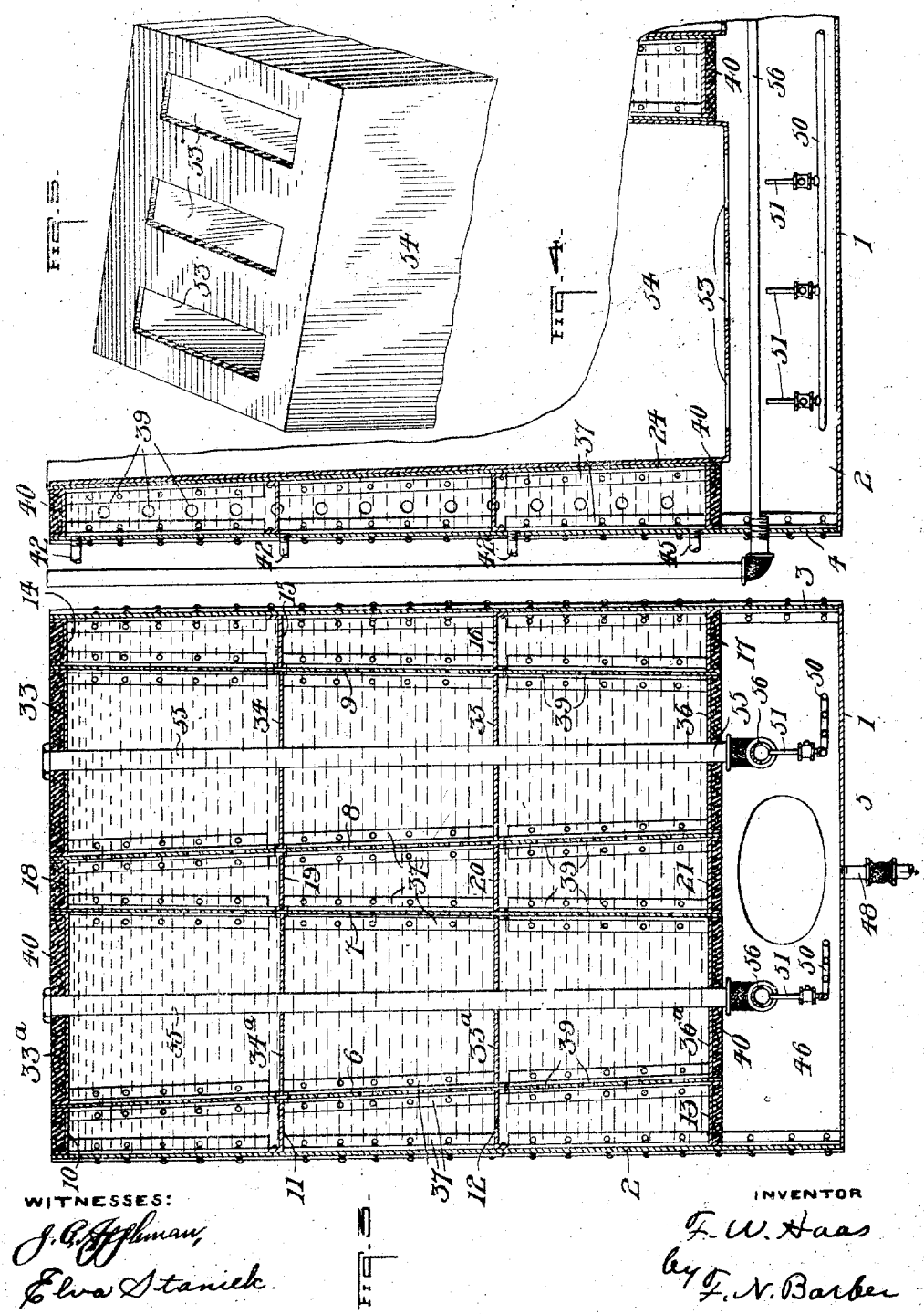

UNITED STATES PATENT OFFICE.

FRED W. HAAS, OF PITTSBURG, PENNSYLVANIA, ASSIGNOR OF ONE-THIRD TO GEORGE N. POWELL, OF PITTSBURG, PENNSYLVANIA.

RAW-WATER-FREEZING APPARATUS.

980,152.  Specification of Letters Patent. Patented Dec. 27, 1910.

Application filed October 21, 1909, Serial No. 523,754. Renewed October 15, 1910. Serial No. 587,315.

*To all whom it may concern:*

Be it known that I, FRED W. HAAS, a citizen of the United States, residing at Pittsburg, in the county of Allegheny and State of Pennsylvania, have invented or discovered new and useful Improvements in Raw-Water-Freezing Apparatus, of which the following is a specification.

My invention relates to ice machines or freezing apparatus and has particular reference to that class of ice machines which make ice from water in its raw state, that is, from water which has not been treated for the purpose of sterilizing or purifying the same, but it is to be understood that I do not limit my freezing apparatus to any particular use.

The objects of my invention are, first, to provide means for causing the removal of foreign matter from raw, or natural, water, so that ice blocks will be made transparent, and free from white or snow centers, boiler gas, bacteria, and other foreign matter; second, to make ice in a shorter time by perfecting the flow of the refrigerant and causing a current of cooled air to pass through the water while freezing; third, to perfect the construction of freezing tanks whereby their efficiency is greatly improved, whereby the cans can be loosened from the walls of the tanks without loss of refrigerant and whereby the precipitated sediment from the raw water may be drawn off; fourth, to provide efficient check valves for the air pipes; fifth, to provide means for cooling the air before its entrance to the ice-cans, and to prevent freezing of the water on the outside of the ice-cans; and sixth, to make numerous other minor improvements which reduce the cost and increase the efficiency of the apparatus.

Referring to the accompanying drawings which illustrate one of the many ways in which my invention may be embodied, Figure 1 is partly a vertical section and partly a side elevation of a freezing apparatus constructed in accordance with the preferred form thereof, said figure being on the line 1—1, Fig. 2; Fig. 2, a top plan view of the same; Fig. 3, a section on the line III—III, Fig. 2; Fig. 4, a vertical section of one end of my invention showing a modified form of air outlet; Fig. 5, a perspective of the lower end of an ice-can; Fig. 6, a section on the line VI—VI, Fig. 1; Fig. 7, a detail vertical section of one of the air inlets with one of its outlets, together with the semi-cylindrical conveyer for the air after the ice congeals entirely across the cans; Fig. 8, a vertical section of one of the air outlets and its contained valve; Fig. 9, a perspective of one of the plates hereinafter referred to; and Fig. 10, a vertical section of a portion of my apparatus showing a modification thereof.

On the drawings, I show the freezing tank, having the sheet metal bottom 1, sides 2 and 3, and ends 4 and 5, secured together, as hereinafter to be explained, so as to form a rectangular tank.

Extending from the end 4 to the end 5 are four substantially vertical metal plates 6, 7, 8, and 9. The plate 6 is spaced from the side 2 preferably by the metal channels 10, 11, 12, and 13, the channel 10 being at the top of the tank, the channel 13 being a short distance above the bottom 1, and the channels 11 and 12 dividing the space between the channels 10 and 13 preferably substantially equally. The plate 9 is spaced from the side 3 preferably by the metal channels 14, 15, 16, and 17 arranged as the channels 10, 11, 12, and 13 are, and located, respectively, in the same horizontal planes. The plates 7 and 8 are centrally arranged in the tank and are spaced apart preferably by the metal channels 18, 19, 20, and 21, respectively, in the same horizontal planes as the channels 10, 11, 12, and 13. All the said channels are secured water tight to the sides 2 and 3, and to the plates 6 to 9 preferably by rivets, as shown on the drawings.

The space between the plates 8 and 9 is formed into two compartments 22 and 23 by means of the substantially vertical metal plates 24, 25, 26 and 27. The end 4 and the plate 24 are spaced apart preferably by the metal channels 28, 29, 30, and 31, respectively, in the same horizontal planes as the channels 10, 11, 12, and 13. The end 5 and the plate 27 are spaced apart by four channels (only 32 being shown) in the planes of the channels 10, 11, 12, and 13, respectively. The plates 25 and 26 are arranged centrally of the space between the plates 6 and 7 and divide the said space into the said compartments 22 and 23. The plates 25 and 26 are spaced apart by the channels 33, 34, 35, and 36, respectively, in the planes of the channels 10, 11, 12, and 13. The said channels are connected water tight to the ends 4 and 5, the plates 6, 7, and 24 to 27 by rivets as shown on Fig. 1.

The space between the plates 6 and 7 is divided in two compartments $22^a$ and $23^a$, corresponding to the compartments 22 and 23. The parts surrounding the compartments $22^a$ and $23^a$ are exactly like those described around the compartments 22 and 23. Accordingly, the same reference numerals will be used for the parts around the compartments $22^a$ and $23^a$ but with the exponent $a$.

The several described sides, ends, and plates where contiguous are secured together water tight by means of the metal angle bar 37 riveted to the said plates. The sides and ends are secured together by the external angle bars 38 riveted to the said sides and ends.

The plates 6, 7, 8, and 9 are provided with the holes 39 opposite the spaces between the end 4 and the plate 24, the end 4 and the plate $24^a$, the plates 25 and 26, the plates $25^a$ and $26^a$, the end 5 and the plate 32, and the end 5 and the plate $32^a$.

It will now be seen that the four compartments 22, $22^a$, 23, and $23^a$ are each surrounded by double or jacketed walls constructed so that a fluid within the double walls or jackets might circulate completely around all of the compartments. The double walls or jackets are divided by the aforesaid channels into three horizontal sections, having preferably no communication with one another except by the holes 39 which extend on both sides of some of the intermediate channels as shown on Fig. 1.

The upper channels open upwardly and the lower channels open downwardly and are filled with cork 40 or other poor conductor of heat.

Brine or other fluid refrigerant is conducted from a source of supply through the pipe 41 to the various branch pipes 42 which enter the jackets at the end 4 just below the channels 28, 29, and 30 which form a portion of the roof of the three brine sections before mentioned. The brine circulates around in the jackets and finally finds its outlets near the bottom of the brine sections by means of the pipes 43, from which the brine is taken away by the return pipe 44. By placing the inlet pipes at the top of the brine circulating section, I insure a perfect circulation of the brine into all the corners and other portions.

45 is a valved drain pipe extending through the end 4 into the lower part of the lowest brine or refrigerant section as shown on Fig. 1.

The space below the bottom channels forms a water chamber 46 which communicates with the four compartments 22, $22^a$, 23, and $23^a$.

47 is a valved inlet pipe through which water to be frozen is admitted to the chamber 46, and 48 is a valved drain pipe leading from the said chamber 46.

49 are air inlets leading into the chamber 46 and conveying air to the coils 50 having the upwardly extending outlet or jets 51, each provided with the upwardly-opening check valve 52 to prevent access of water to the air coil. These outlets or jets are arranged beneath the openings or slots 53 in the bottoms of the ice-cans 54, which are seated in the compartments 22, $22^a$, etc., and extend somewhat below the bottom of the lowest refrigerant section as shown in Fig. 1, so that ice at the bottom of the ice cans will not be frozen so hard as to hook through the openings 53 against the bottoms of the lowest chambers, and prevent the ready withdrawal of the ice-cans with their contained blocks of ice.

Extending from the chamber 46 are the two vertical air pipes 55 extending through the channels between the plates 25 and 26, and between the plates $25^a$ and $26^a$. Each pipe and its accessories are the same, necessitating the description of one only. The pipe 55 (Figs. 1 and 8) has its lower end connected to a T-connection provided with the horizontal branch air conveyers 56 lying directly over the jets 51. Those parts of the air conveyers which lie over the jets 51 have the lower longitudinal half removed, having a concave or channel air conduit which under certain conditions will lead air to the pipe 55, broken off in Fig. 2, but shown complete in Fig. 1. With the pipe 55 is the pipe 57 spaced from the pipe 55 by cork 58. Near the top of the pipe 55 is a chamber containing the float valve 58 lighter than water. This valve 58 seats upwardly against the tube 59 which projects into the valve chamber and leads to the atmosphere.

The plates forming the compartments 22, $22^a$, 23, and $23^a$ are inclined so that the compartments taper downwardly, so that the ice-cans which taper correspondingly may be withdrawn more readily.

The operation is as follows: The cold brine is caused to circulate through the brine sections from the inlet 41 to the outlet 44. Water is admitted through the inlet 47 until it stands at such a level in the cans 54 that the latter will, at the completion of the freezing operation, be filled with ice to the desired height. Compressed air is caused to enter the chamber 46 by way of the inlets 49, the coils 50, and the jets 51 and bubble up through the water. The cooling of the water to a low temperature causes bacteria to become dormant so that they will be precipitated to the bottom of the tank. The agitation of the water by the air causes all parts of the water to be equally treated and causes the ice in the cans 54 to be entirely clear from top to bottom. As soon as the ice freezes across the cans so as to prevent the free escape of the air, the air then travels along the conduits 56 and up the pipes 55, thus permitting the agitation of the water to be kept up until the blocks of ice have frozen to the bottom. The valve 58 will be forced up by water in the pipe so as to close the outlet 59. The air in the water being lighter than the water rises to the top of the tube and lowers the valve from its seat permitting the air to escape until the water which is heavier than the valve reseats it. As the air displaces the water the valve will sink with it, the valve being heavier than the air. After the refrigeration is complete, the brine is drawn off through the pipe 45 into a brine tank or other receptacle to be reused. A hot fluid as steam is then forced through the brine sections to loosen the ice-cans from the tanks. The hot fluid is then removed and the freezing process is repeated. The water in the chamber 46 is drawn off to remove the matter precipitated from the water.

Referring now to Fig. 10, the construction is the same as that hereinbefore described except that I have shown two interior channels made up of angle bars overlapping and secured together by bolts. In assembling the apparatus the interior channels can be bolted together by reaching down from the top and up from the bottom before the top and bottom channels have been inserted.

I use the term "channel" in the specification in the sense which it has in the structural metal art, where it means a plate having flanges at its opposite edges.

While I have shown and described minutely a definite size or quantity and definite elements and their combinations, I do not restrict myself thereto except where the state of the art or the precise wording of the claims require such restriction.

Other refrigerants than brine may be used in my apparatus, and expansion coils may be placed in the brine compartments.

I claim—

1. In an ice-making apparatus, a can to contain water to be frozen, means for injecting air into the can from below, and means in the path of the air to intercept the air and conduct it away from the can when the water in the can freezes entirely across the same.

2. In an ice making apparatus, jacketed compartments, means for supplying the jacket with refrigerant, removable ice cans seated in the compartments and having their lower ends open and below the bottom of the refrigerant containing jacket whereby ice cannot form externally of the sides thereof and beneath the jacket.

3. In an ice-making machine, a tank, a refrigerant compartment located in the tank above the bottom thereof and having walls preventing the passage of fluid between the tank and the compartment, and an ice-can surrounded laterally by the said chamber and having its bottom perforated and below the bottom of the said chamber whereby the ice cannot form externally of the sides of the can and beneath the refrigerant compartment.

4. In an ice making apparatus, a refrigerant jacket having upright plates spaced apart at the top and bottom by channeled plates opening outwardly, and heat insulating material in the channels.

5. In an ice making apparatus, a casing having upright jacketed walls surrounding compartments for the water to be frozen, means for dividing the jacket into different levels, pipes at the tops of the levels for injecting refrigerant, and pipes at a lower portion of the levels for conducting the refrigerant away.

6. In an ice making apparatus, a casing having upright jacketed walls surrounding compartments for the water to be frozen, means for dividing the jacket into different levels, pipes at the tops of the levels for injecting refrigerant, and pipes at the opposite side of the casing and at a lower portion of the levels for conducting the refrigerant away.

7. In an ice making apparatus, a casing having upright jacketed walls surrounding compartments for the water to be frozen, the ends of some jacketed walls abutting the sides of other jacketed walls, there being openings in the latter walls alongside of the ends of the abutting jacketed walls.

8. In an ice making apparatus, a water chamber below and in free communication with a compartment in which the refrigeration is accomplished, means for injecting air into the chamber, and means between the air-injecting means and the refrigerating compartment to intercept and convey off the air when the water in the compartment freezes entirely across.

9. In an ice making apparatus, a water chamber below and in communication with a compartment in which the refrigeration is accomplished, means for injecting air into the chamber, a downwardly concave conduit over the air-injecting means, and means for leading away the air from the said conduit.

10. In an ice making apparatus, a water compartment, a water containing chamber below the same and in communication therewith, means for injecting compressed air into the water, an air tube to carry off the air when the water is frozen entirely across, a valve lighter than water in said outlet, and an air outlet above the valve closed by the valve when seated by the water.

11. In an ice making apparatus, means for supplying the water to be frozen with air from below during the freezing action and means arranged below the water to be frozen for providing an escape for the air when the water freezes so as to prevent the escape of air through the water and for continuously keeping the water in contact with the ice during the entire freezing action.

Signed at Pittsburg, Pa., this 19th day of October, 1909.

FRED W. HAAS.

Witnesses:
F. N. BARBER,
ANNA R. BEATTY.